(12) United States Patent
Ball (10) Patent No.: US 11,745,285 B1
(45) Date of Patent: Sep. 5, 2023

(54) MIG WELDING TORCH ANGLED-APPROACH ADAPTER THAT ENABLES WELDING IN CONFINED SPACES

(71) Applicant: Silas Ball, Leverett, MA (US)

(72) Inventor: Silas Ball, Leverett, MA (US)

( * ) Notice: Subject to any disclaimer, the term of this patent is extended or adjusted under 35 U.S.C. 154(b) by 0 days.

(21) Appl. No.: 18/109,345

(22) Filed: Feb. 14, 2023

(51) Int. Cl.
  *B23K 9/29* (2006.01)
  *B23K 9/173* (2006.01)

(52) U.S. Cl.
  CPC .............. *B23K 9/293* (2013.01); *B23K 9/173* (2013.01)

(58) Field of Classification Search
  CPC ........ B23K 9/291; B23K 9/293; B23K 9/295; B23K 9/173; B23K 9/186
  USPC ....... 219/70, 74, 75, 137.31, 137.51, 137.61
  See application file for complete search history.

(56) References Cited

U.S. PATENT DOCUMENTS

| 4,268,740 A | 5/1981 | Sanders | |
| 5,440,100 A * | 8/1995 | Stuart | B23K 9/287 219/137.61 |
| 8,637,788 B2 | 1/2014 | Laymon | |

* cited by examiner

*Primary Examiner* — Phuong T Nguyen
(74) *Attorney, Agent, or Firm* — Larry J. Guffey, Esq.; Oliver & Grimsley, LLC (57) ABSTRACT

A MIG welding torch adapter that attaches to and/or replaces a welding torch's nozzle and enables welding in confined spaces includes: (1) a wire guide, (2) a turning nozzle that is concentric with and encloses said wire guide, (4) a collar that detachably slip-fits onto a MIG welding torch's contact tip, (5) an attachment tube that attaches to the nozzle, (6) an entry guide wire adapter that directs the free end of the torch's electrode wire move into the wire guide, (7) an exit guide wire adapter that guides the electrode wire as it exits this adapter, and (8) entry and exit spacers that enable the torch's shielding gases to flow through this adapter.

20 Claims, 5 Drawing Sheets

MIG WELDING TORCH ANGLED-APPROACH ADAPTER THAT ENABLES WELDING IN CONFINED SPACES

BACKGROUND OF THE INVENTION

1. Field of the Invention

This invention relates to electric heating and welding torches. More particularly, the present invention is an adapter or nozzle and tip extender for a manually-operated, MIG welding torch that allows it to be used in otherwise inaccessible, confined spaces.

2. Description of the Related Art

Figure 1:
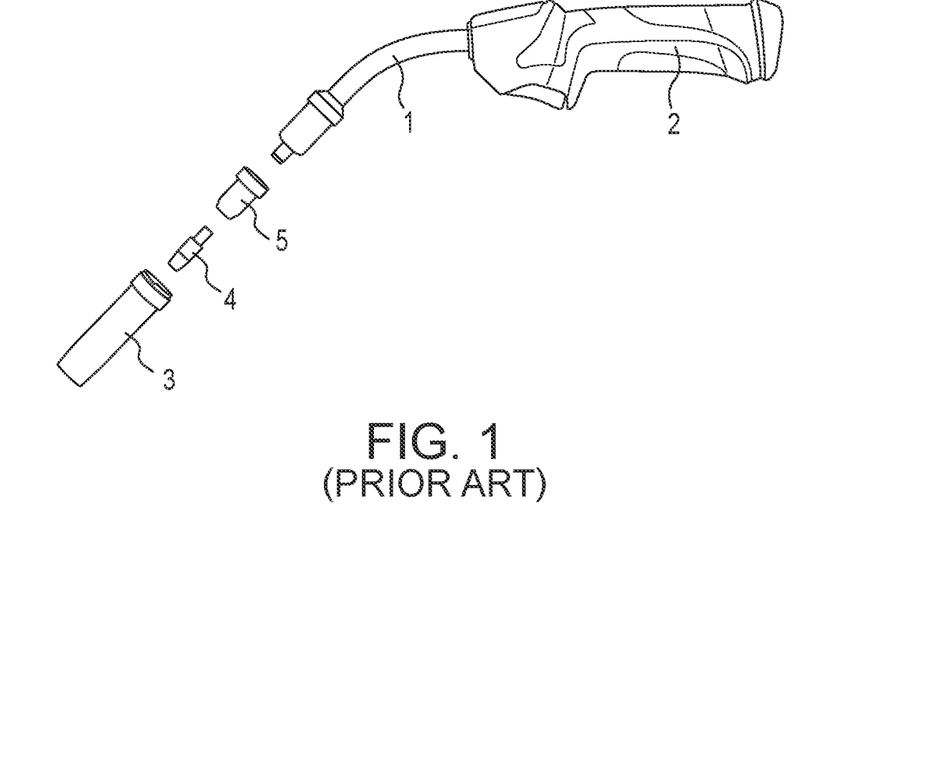
FIG. 1 is a perspective view of a typical MIG (metal inert gas) welding torch.

In a typical welding torch, and more specifically a MIG (metal inert gas) welding torch, a conductor tube 1 (or swan neck; so named because of its shape) is secured to the end of a welding torch handle 2 and generally functions to conduct shielding gases to a weld site and provide a conduit for feeding welding wire from a supply device to the end of the conductor tube. The welding wire is fed through an assembly of consumable components (e.g., nozzle 3, contact tip 4, and diffuser 5) that are connected to the end of the conductor tube. See FIG. 1 where these consumables have been disconnected from the welding torch's conductor tube. These consumables need to be replaced when they become worn or clogged due to the molten metal spatter from a weld pool that is formed in front of the nozzle where the welding wire touches the to-be-welded metal surface or workpiece.

Generally, a welding's consumable nozzle focuses shielding gas on the weld pool to keep contaminants out of it during welding tasks. It's contact tip transfers current to the welding or electrode wire as the wire passes through the torch. Meanwhile, it's gas diffuser provides for the flow of the shielding gas into and through the nozzle in such a manner as to evenly disperse the shielding gas across the weld pool.

Figure 2:
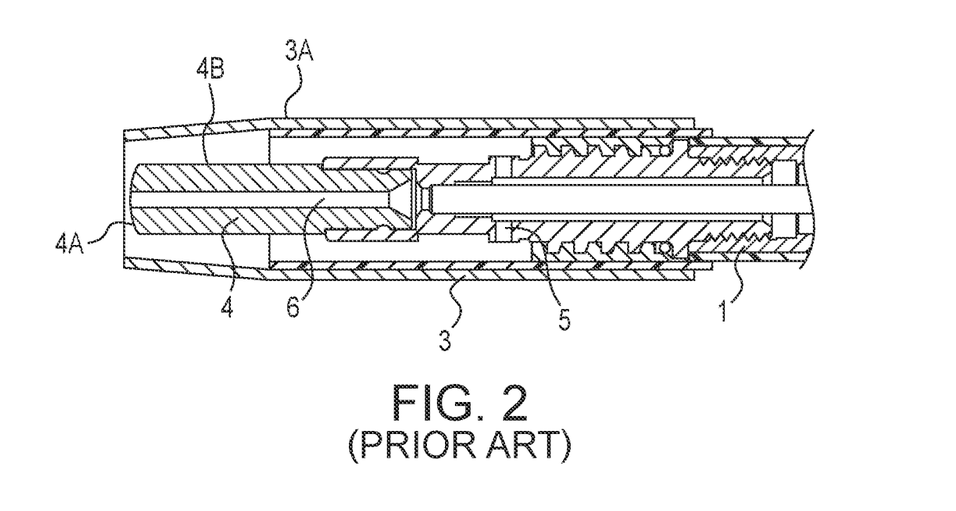
FIG. 2 is a generalized, cross-sectional view of the consumables (i.e., nozzle, contact tip and diffuser) of a MIG welding torch after they have been connected to the end of the torch's conductor tube.

FIG. 2 shows a generalized, cross-sectional view of these consumables after they have been connected to the conductor tube's end. A conduit or passageway 6 extends through them and allows for the passage of the welding wire (not shown in this figure) out the end of the nozzle so that it can come into contact with a to-be-welded, metal surface.

There is some variety in the choice of one's nozzle and contact tip to be used in a specific application. For example, in certain welding application it may be desirable that the end of the contact tip be either extended from, flush, or recessed with respect to the end of the nozzle. Meanwhile, the geometry and size of these parts often varies within only a relatively small range for standard, consumable parts. For example, the outside diameters and lengths of these nozzles are often approximately 1 inch in outside diameter, D, and 2.5-3 inches in length. Meanwhile, a contact tip's outside diameter, $D_t$, is often approximately 0.25 inches.

Knowing that the preferred angle of approach of a welding wire to a workpiece is 90 degrees, and that this can be reduced to maybe 45 degrees when necessary, the dimensions of standard nozzles can quickly become problematic when one is trying to weld in a confined space. For example, if one is trying to weld all the way around an automobile tail pipe that is mounted proximate to and beneath the automobile's heat shield that lies under its passenger compartment, while maintaining a 45 degree approach angle to the top of the tail pipe, one can quickly compute that to use a 3 inch long, 1 inch diameter nozzle in this application requires that the top of the tail pipe be at least 2.6" below the heat shield (i.e., with sine 45°=Vertical/3" (where the length of the hypotenuse, of a right triangle, is assumed to be the 3" length of a nozzle that is being held at an angle of 45 degrees to a horizontal surface that is to be welded); the required clearance height~Vertical+0.5=3" sine 45°+0.5"=2.12"+0.5"~2.6"). As all automotive mechanics know, this is seldom the case and, consequently, the time-consuming task of removing the tail pipe must be accomplished before the tail pipe can be welded.

There have been prior attempts to modify a MIG welding torch to allow it, with its standard nozzle, to access confined spaces for various welding tasks. See U.S. Pat. Nos. 4,268,740, 5,440,100 and 8,637,788. However, none of these would allow for adequately welding of the top of a tail pipe that is less than 2.6 inches below an automobile's heat shield.

The present invention seeks to provide an easy-to-use, quick connecting, slip-on or other type of adapter that fits onto or replaces a MIG welding torch's standard nozzle extends it to enable the torch's welding wire to access and weld in confined spaces.

DESCRIPTION OF THE PREFERRED EMBODIMENT

Recognizing the need for a device or means that will allow a MIG welder to be used in what would otherwise be inaccessible, confined spaces, the present invention seeks to provide this device or means.

Various aspects, advantages and alternative and preferred embodiments may be included in the following description of the present invention. All patents, patent applications, published articles and documents and other things referenced herein are hereby incorporated by this reference in their entirety and for all purposes. To the extent of any inconsistency or conflict in the definition or use of terms between any of the incorporated publications, documents or things and the present application, those of the present application shall prevail.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 3:
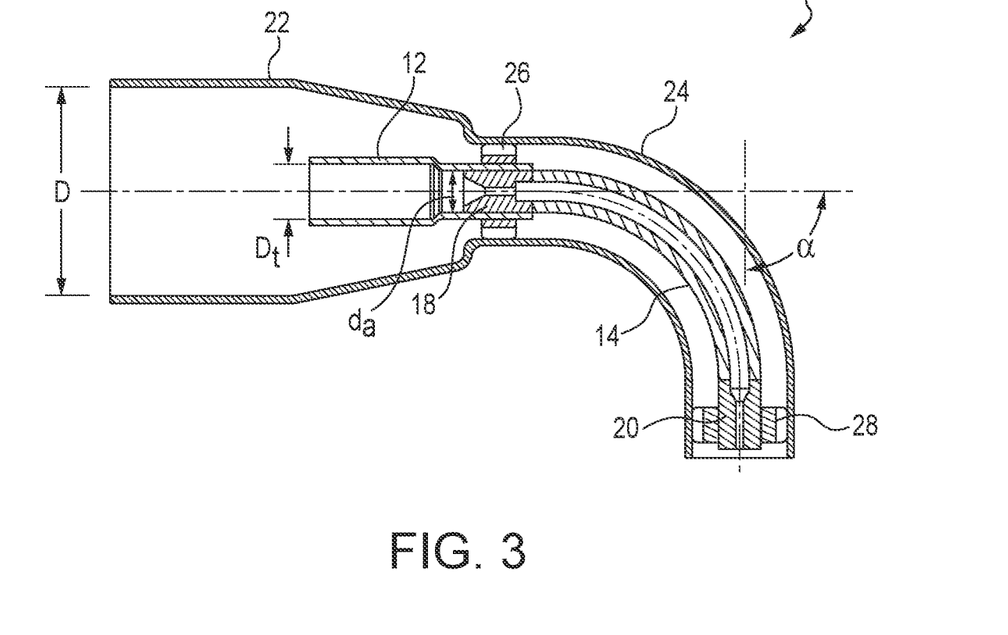
FIG. 3 is a cross-sectional view of a first preferred embodiment of the present invention.

FIG. 3 is a cross-sectional view of a first preferred embodiment of the present invention 10. It is seen to consist of the following principal elements: a conductive collar 12, a wire guide 14, an entry wire guide adapter 18, an exit wire guide adapter 20, an attachment tube or nozzle 22, a turning nozzle 24, an entry, non-conductive spacer 26 and an exit, non-conductive spacer 28.

The present invention is also seen to be configured such that it has a centerline that extends between its ends, and that all of the above listed elements also have centerlines that coincide and align with various portions of the centerline of the present invention. The turning nozzle 24 and wire guide 14 are actually two concentric, circular tubes; with the wire guide being at the center and enclosed by the larger diameter, turning nozzle. The materials of construction used in all of the above listed elements are selected so that they can withstand the large heat loads that are generated at the union of the various metals that are being joined by a MIG welding process.

Figure 4:
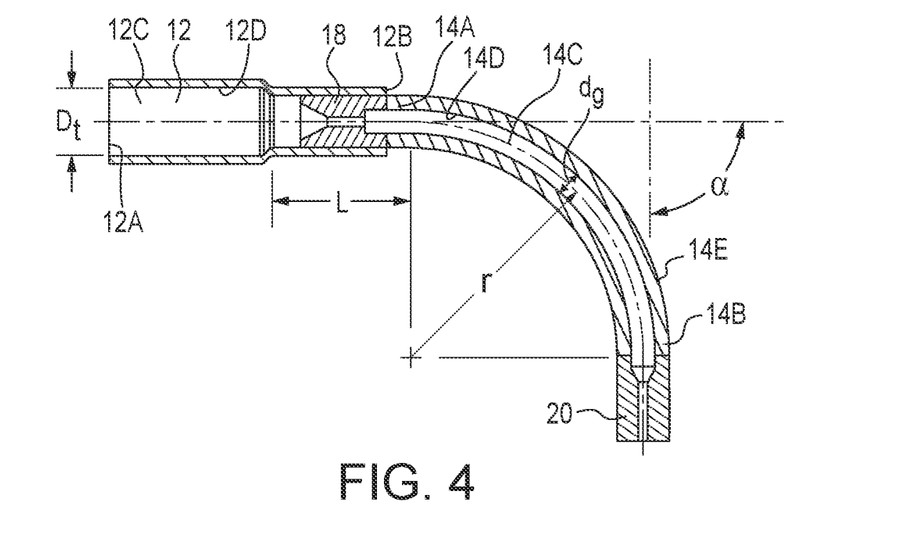
FIG. 4 is a cross-sectional view of a preferred embodiment of the collar and wire guide elements of the present invention.

The conductive collar 12 of the present invention is configured to allow it to detachably attach to the free end 4A of a MIG welding torch's contact tip 4. This collar has a free end 12A, an enclosed end 12B, a collar passageway 12C that extends between these ends and has an inner 12D and an outer 12E surface. The free end of this inner bounding surface is configured to allow the collar to slip-fit around the conductive tip's cylindrical outer surface 4B. It is made from a conductive material so that it can allow the electrode wire to continue to be electrified as it passes through the present invention. During this passage, the electrode wire is seen to be in frequent contact with its surrounding wire guide 14 which enhances this guide's ability to transfer current to the electrode wire. See the left-hand side of FIG. 4.

The wire guide 14 of the present invention has guide entry 14A and exit 14B ends, a uniform diameter, guide passageway 14C that extends between these ends, and guide inner 14D and guide exterior 14E surfaces. See the right-hand side of FIG. 4. The guide's entry end 14A is configured to attach to the collar's enclosed end. If it is desired to reduce the diameter of this guide down from that of the inside diameter of the collar 12 (which we denote as $D_t$) an appropriately sized adapter can be used between these ends, 14A, 4A, thereby reducing the diameter of the outer from approximately $D_t$ down to $d_a$. See FIG. 3. Such reductions are necessary when it is desired to use the present invention to enable welding in very small, confined spaces. In this instance, the magnitude of this reduction can be in the range of $d_a/D_t$=0.4-0.9.

As its name implies, the centerline of this guide 14 follows a path that provides it with a smooth bend between its portions that have this bend. This bend can begin directly at the guide's entry end 14A or it may begin after a straight length portion 14F whose length we denote by L, see FIG. 4. This length can be of any length as may be required and as dictated by the dimensions of the confined space into which the end of the torch is to operate.

The normals that extends from the planar surfaces that enclose each end of this portion of smooth bend will intersect at an included or bending angle, a, that is usually selected to be in the range of 45 to 135 degrees; however, it could theoretically be expected to be in the range of 1 to 180 degrees. Meanwhile, in order to allow the present invention to be useable in the smallest of confined spaces, the bending radius, r, of this guide is in general made to be in the range of r/D (the nozzle's outer diameter)=0.5-1.0. See FIGS. 3 and 4.

Figure 5:
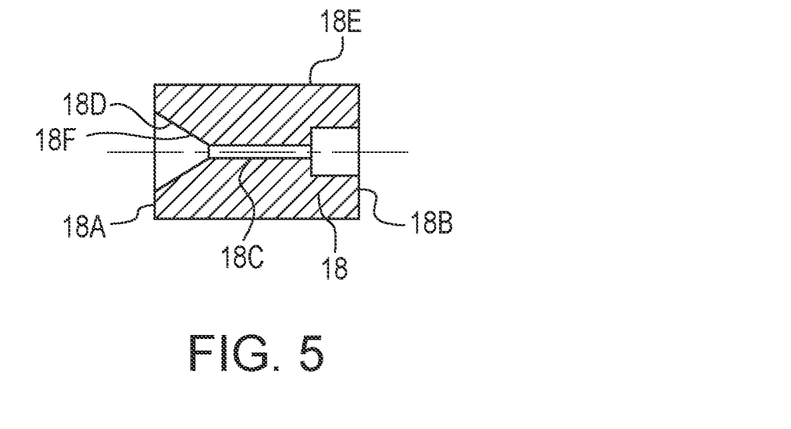
FIG. 5 is a cross-sectional view of a preferred embodiment of the entry wire guide adapter element of the present invention.

The diameter of the guide's passageway 14C is chosen to allow the electrode wire to slide easily through it. For example, if the diameter or the electrode wire is $d_w$, the wire guide passageway's inner diameter, $d_g$, will often be in the range of 1.05-1.2 of $d_w$. $d_3$ The entry wire guide adapter 18 is configured to provide an entry way and guide to help the free end of an electrode wire move into the wire guide 14. This entry adapter is generally tubular in shape and has entry 18A and exit 18B ends, an entry adapter passageway 18C, and inner 18D and outer 18E surfaces. See FIG. 5. The diameter of the entry adapter passageway 18C is not uniform along the length of this adapter. Proximate its entry end, the shape of this adapter's inner surface 18F is conical, with its larger diameter being located at its entry and then reducing in size to provide a smooth union into its mid-section which has a uniform diameter. Proximate its exit end, this adapter's outer surface 18E is configured to fit flush against a section of the guide's exterior surface 14E.

Figure 6:
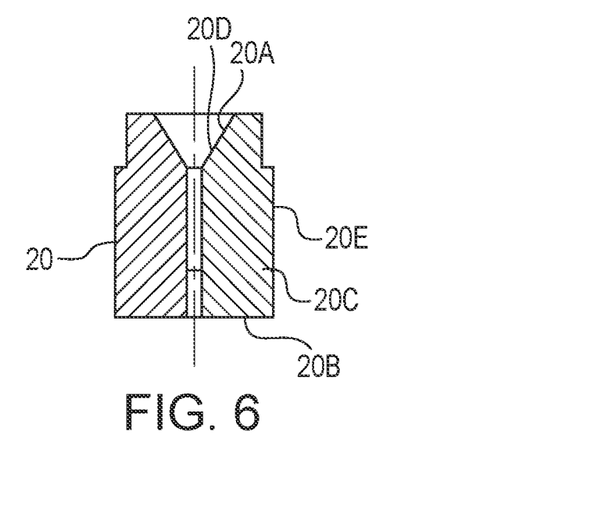
FIG. 6 is a cross-sectional view of a preferred embodiment of the exit wire guide adapter element of the present invention.

The exit wire guide adapter 20 of the present invention is generally tubular in shape and has entry 20A and exit 20B ends, a passageway 20C, and inner 20D and outer 20E surfaces. See FIG. 6. Proximate its entry end, the shape of this adapter's inner surface 20D is conical, with its larger diameter being located at its entry and then reducing in size to direct the wire that passes through it out of this adapter's exit.

Figure 7:
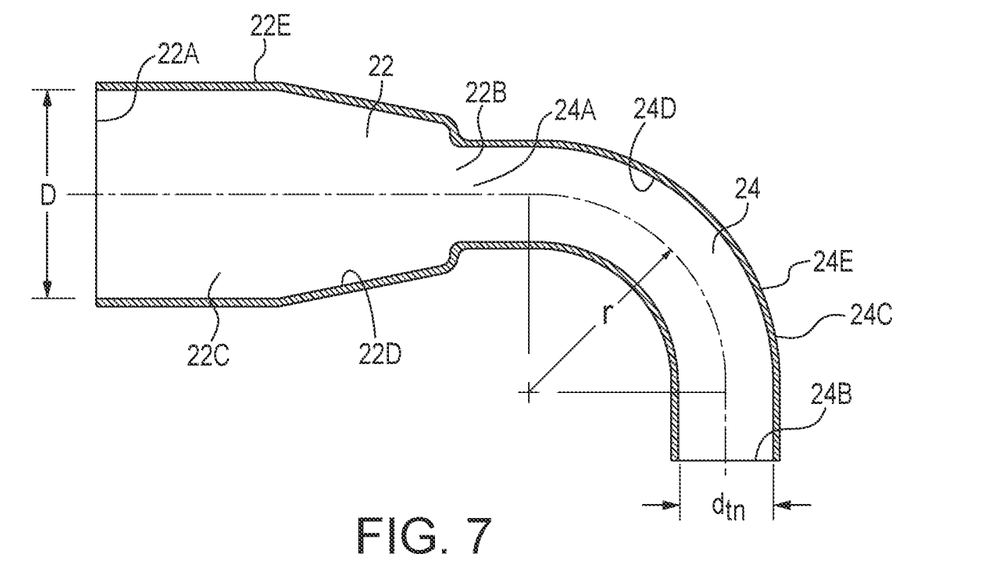
FIG. 7 is a cross-sectional view of a preferred embodiment of the attachment and turning nozzle elements of the present invention.

The attachment nozzle 22 of the present invention has attachment nozzle entry 22A and attachment nozzle exit 22B ends, an attachment nozzle passageway 22C, and attachment nozzle inner 22D and attachment nozzle outer 22E surfaces. The attachment nozzle inner surface 22D, proximate its entry end 22B is configured to provide a detachable, slip fit onto the outer surface 3A of the welder's nozzle. Meanwhile, the attachment nozzle inner surface 22D, proximate its exit end 22B, will usually be flared inward (yielding a decreasing diameter) so as to allow a smooth connection to the tubular turning nozzle that connects to its exit end and which is usually of a much smaller diameter (i.e., $d_{tn}$) than that the attachment nozzle's entry end (i.e., D) since the present invention is designed to be used in confined spaces: thus, $d_{tn}/D$ is usually in the range of 0.3-0.7. See the left-hand side of FIG. 7.

The turning nozzle 24 of the present invention has turning nozzle entry 24A and turning nozzle exit 24B ends, a turning nozzle passageway 24C, and turning nozzle inner 24D and turning nozzle outer 24E surfaces. Its length from end to end is dependent on its radius of curvature or bending radius, r, and its degree of bend or bending angle, α. See the right-hand side of FIG. 7.

Figure 8:
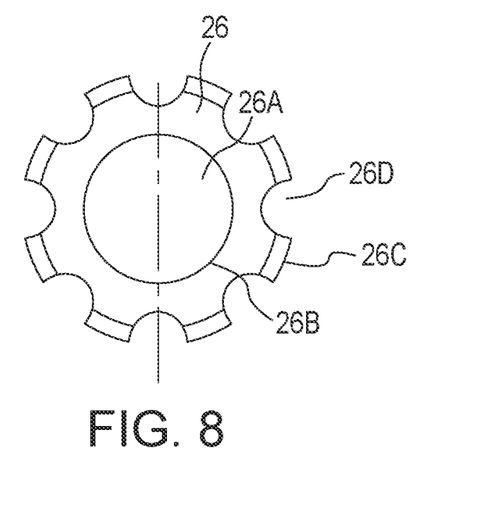
FIG. 8 is a cross-sectional view of a preferred embodiment of the entry spacer element of the present invention.

The entry spacer 26 of the present invention is located proximate the entry end of the bending nozzle and serves to isolate the electrified outer guide from the non-electrified, turning nozzle, while also providing a passageway through which the MIG welder's shielding gases pass as they flow between the turning nozzle's inner surface and the outer guide's outer surface and out the exit end of the turning nozzle. See FIG. 8. This entry spacer is seen to be disc shaped with an entry spacer passageway 26A, an entry spacer inner surface 26B, an entry spacer outer surface 26C having entry spacer openings 26D that fits around the spacer's outer surface and provide passageways for the shielding gases. It is fabricated from a non-conductive, electrically insulating material (e.g., porcelain). A similar exit spacer 28, with is located proximate the exit end of the bending nozzle with the exit spacer's inner surface being configured to lie proximate the tip extension's outer surface 20E.

The present invention is easy to attach to a welder's nozzle and contact tip. One merely extends about 5-10 inches of electrode wire and then hand feeds its free end through the present invention. It is then easily slipped onto the welder's nozzle and contact tip.

Previously it was mentioned that when the standard nozzle on a MIG welder is being used to try to weld all the way around an automobile tail pipe that is mounted proximate to and beneath the automobile's heat shield that lies under its passenger compartment, a clearance height below the heat shield of approximately 2.6" is needed. Using the present invention on the end of such a nozzle allows such welds to be completed when this clearance height is only approximately one inch.

Figure 9:
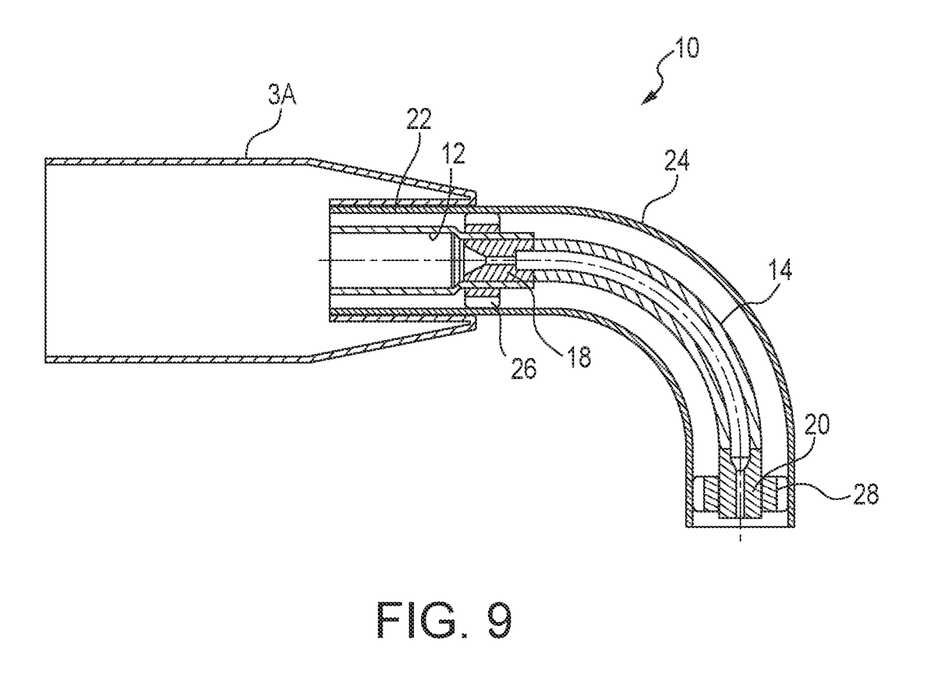
FIG. 9 is a cross-sectional view of a second preferred embodiment of the present invention.

While FIG. 3 was previously identified as showing a first preferred embodiment of the present invention, it should be noted that there is a second preferred embodiment of the present invention. This is shown in FIG. 9.

This second preferred embodiment is directed towards those situations in which a nozzle manufacture will modify its nozzle to allow for a simpler means of attaching the present invention's second embodiment of its MIG welding torch adapter. With the nozzle manufacturer's assumed nozzle modification 3A, which entails that, near its free or exit end or tip, the nozzle's outer surface is bent inward so as to create a cylindrical, uniform diameter, cavity surface into which can be slipped an attachment tube 22 in the form of a straight tube extension forward of the present invention's turning tube or nozzle 24. Meanwhile, the rest of this modified nozzle remains as before with its entry end being configured to connect to the end of a torch's conductor tube 1.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is set forth in the herein claims to the invention.

I claim:

1. A MIG welding torch adapter that attaches to a welding torch's contact tip and a MIG welder nozzle and enables the free end of an electrode wire, having a set wire diameter, $d_w$, and which is exiting from said contact tip, along with the torch's shielding gases, to access confined spaces and thereby enable MIG welding in these confined spaces, said MIG welding torch adapter comprising:

a wire guide having wire guide entry end and wire guide exit ends, a wire guide outer surface, a wire guide passageway with a wire guide inner surface, a specified diameter, $d_g$, and a centerline that extends between said ends, a turning nozzle that is concentric with and encloses said wire guide, and has a turning nozzle entry end, a turning nozzle exit end, a turning nozzle passageway that extends between said ends, a turning nozzle inner surface and a turning nozzle outer surface, a conductive collar having a free end, an enclosed end, a collar passageway, a collar inner surface that extends between said ends, and wherein said collar inner surface is configured to slip-fit onto said contact tip and said enclosed end is configured to directly connect to said wire guide entry end, an attachment tube having an attachment tube entry end, an attachment tube exit end, an attachment tube passageway that extends between said ends, an attachment tube inner surface and an attachment tube outer surface, and wherein attachment tube inner surface that is proximate said attachment tube entry end is configured to attach to said MIG welder nozzle, an entry wire guide adapter having an inner surface that is configured to be conical in shape and provide an entry way that serves to direct said free end of said electrode wire into said adjoining entry end of said wire guide, a non-conductive, entry spacer having an entry spacer passageway and an entry spacer outer surface, wherein said entry spacer passageway is configured to allow said wire guide to pass through said an entry spacer passageway, and said entry spacer outer surface has a plurality of openings that enable said shielding gases to flow into and between said turning nozzle inner surface and said wire guide outer surface, and an exit spacer having an exit spacer passageway with an exit spacer outer surface, wherein said exit spacer passageway is configured to allow said wire guide to pass through said an exit spacer passageway, and said exit spacer outer surface has a plurality of openings that enable said shielding gases to flow from said turning nozzle exit end and into the surrounding environment.

2. The MIG welding torch adapter as recited in claim 1, wherein:

said centerline follows a path that provides said turning nozzle with a bend that is defined by said turning nozzle exit end being at a distal location from said turning nozzle entry end and such that a normal to said turning nozzle exit end assumes a specified bending angle with respect to a normal that extends from said turning nozzle entry end, and wherein said specified bending angle is in the range of 45 to 180 degrees.

3. The MIG welding torch adapter as recited in claim 2, wherein:

said turning nozzle having a bending radius of "r" and where the ratio of said bending radius to that of the diameter, D, of the attachment nozzle entry end is in the range of r/D=0.5-1.0.

4. The MIG welding torch adapter as recited in claim 3, wherein:

said attachment tube is configured to have its diameter decrease in size from its entry end, which has a diameter, D, that is equivalent to the diameter of the entry end of said attachment nozzle, to its exit end so that said exit end can attach to the entry end of said turning nozzle, which has a turning nozzle diameter of $d_{tn}$, and wherein the ratio of said entry and exit ends of said attachment tube being in the range of $d_{tn}/D=0.3-0.7$.

5. The MIG welding torch adapter as recited in claim 4, wherein:

said wire guide passageway is configured so that the ratio of said wire guide passageway diameter, $d_g$, to that of said electrode wire diameter, $d_w$, is in the range of $d_g/d_w=1.05\text{-}1.2$.

6. The MIG welding torch adapter as recited in claim 4, wherein:

said entry and exit spacers are fabricated from a non-conducting, electrically insulating material.

7. The MIG welding torch adapter as recited in claim 1, wherein:

said attachment tube is configured to have its diameter decrease in size from its entry end, which has a diameter, D, that is equivalent to the diameter of the entry end of said attachment nozzle, to its exit end so that said exit end can attach to the entry end of said turning nozzle, which has a turning nozzle diameter of $d_{tn}$, and wherein the ratio of said entry and exit ends of said attachment tube being in the range of $d_{tn}/D=0.3\text{-}0.7$.

8. The MIG welding torch adapter as recited in claim 1, wherein:

said wire guide passageway is configured so that the ratio of said wire guide passageway diameter, $d_g$, to that of said electrode wire diameter, $d_w$, is in the range of $d_g/d_w=1.05\text{-}1.2$.

9. The MIG welding torch adapter as recited in claim 1, wherein:

said entry and exit spacers are fabricated from a non-conducting, electrically insulating material.

10. The MIG welding torch adapter as recited in claim 1, wherein:

said wire guide, entry and exit wire guide adapters are fabricated from an electrically conductive material.

11. A MIG welding torch adapter that attaches to a welding torch's contact tip and replaces said torch's nozzle, and enables the free end of an electrode wire, having a set wire diameter, $d_w$, and which is exiting from said contact tip, along with the torch's shielding gases, to access confined spaces and thereby enable MIG welding in these confined spaces, said MIG welding torch adapter comprising:

a wire guide having wire guide entry end and wire guide exit end, a wire guide outer surface, a wire guide passageway with a wire guide inner surface, a specified diameter, $d_g$, and a centerline that extends between said ends, a turning nozzle that is concentric with and encloses said wire guide, and has a turning nozzle entry end, a turning nozzle exit end, a turning nozzle passageway that extends between said ends, a turning nozzle inner surface and a turning nozzle outer surface, a conductive collar having a free end, an enclosed end, a collar passageway with a collar inner surface that extends between said ends, and wherein said collar inner surface is configured to slip-fit onto said contact tip and said enclosed end is configured to directly connect to said wire guide entry end, an entry wire guide adapter having an inner surface that is configured to be conical in shape and provide an entry way that serves to direct said free end of said electrode wire into said adjoining entry end of said wire guide, an entry spacer having an entry spacer passageway and an entry spacer outer surface, wherein said entry spacer passageway is configured to allow said wire guide to pass through said an entry spacer passageway, and said entry spacer outer surface has a plurality of openings that enable said shielding gases to flow into and between said turning nozzle inner surface and said wire guide outer surface, an exit spacer having an exit spacer passageway with an exit spacer outer surface, wherein said exit spacer passageway is configured to allow said wire guide to pass through said an exit spacer passageway, and said exit spacer outer surface has a plurality of openings that enable said shielding gases to flow from said turning nozzle exit end and into the surrounding environment, a MIG welding torch nozzle with an interior, an entry end and an exit end, wherein said exit end is configured to create a cylindrical cavity surface that extends backwards into said nozzle interior, and an attachment tube having an attachment tube entry end, an attachment tube exit end, attachment tube inner and outer surfaces that are concentric with said inner surface of said collar, and wherein said attachment tube outer surface proximate said attachment tube entry end is configured to attach to nozzle cavity surface and said attachment tube exit end attaches to said turning nozzle entry end.

12. The MIG welding torch adapter as recited in claim 11, wherein:

said centerline follows a path that provides said turning nozzle with a bend that is defined by said turning nozzle exit end being at a distal location from said turning nozzle entry end and such that a normal to said turning nozzle exit end assumes a specified bending angle with respect to a normal that extends from said turning nozzle entry end, and wherein said specified bending angle is in the range of 45 to 180 degrees.

13. The MIG welding torch adapter as recited in claim 12, wherein:

said turning nozzle having a bending radius of "r" and where the ratio of said bending radius to that of the diameter, D, of the attachment nozzle entry end is in the range of $r/D=0.5\text{-}1.0$.

14. The MIG welding torch adapter as recited in claim 12, wherein:

said wire guide passageway is configured so that the ratio of said wire guide passageway diameter, $d_g$, to that of said electrode wire diameter, $d_w$, is in the range of $d_g/d_w=1.05\text{-}1.2$.

15. The MIG welding torch adapter as recited in claim 11, wherein:

said turning nozzle having a bending radius of "r" and where the ratio of said bending radius to that of the diameter, D, of the attachment nozzle entry end is in the range of $r/D=0.5\text{-}1.0$.

16. The MIG welding torch adapter as recited in claim 15, wherein:

said wire guide passageway is configured so that the ratio of said wire guide passageway diameter, $d_g$, to that of said electrode wire diameter, $d_w$, is in the range of $d_g/d_w=1.05\text{-}1.2$.

17. The MIG welding torch adapter as recited in claim 11, wherein:

said wire guide passageway is configured so that the ratio of said wire guide passageway diameter, $d_g$, to that of said electrode wire diameter, $d_w$, is in the range of $d_g/d_w=1.05\text{-}1.2$.

18. The MIG welding torch adapter as recited in claim 17, wherein:

said entry and exit spacers are fabricated from a non-conducting, electrically insulating material.

19. The MIG welding torch adapter as recited in claim 11, wherein:
   said entry and exit spacers are fabricated from a non-conducting, electrically insulating material.

20. The MIG welding torch adapter as recited in claim 11, wherein:
   said wire guide, entry and exit wire guide adapters are fabricated from an electrically conductive material.

\* \* \* \* \*